INVENTOR
David H. Schaefer

BY

ATTORNEYS

INVENTOR
David H. Schaefer
BY
ATTORNEYS

INVENTOR
David H. Schaefer

BY

ATTORNEYS

INVENTOR
David H. Schaefer
BY
ATTORNEYS

INVENTOR
David H. Schaefer
BY
ATTORNEYS

United States Patent Office 3,508,036

Patented Apr. 21, 1970

3,508,036

COMPUTING APPARATUS

David H. Schaefer, 617 Rockford Road,
Silver Spring, Md. 20902

Filed Sept. 6, 1966, Ser. No. 577,545
Int. Cl. G06f 7/38
U.S. Cl. 235—156 10 Claims

ABSTRACT OF THE DISCLOSURE

A circuit for obtaining the sum of the squares of a plurality of numbers. The recognition of a unique relation between the binary representation of an integer to be squared and the binary representation of the difference between the square of that number and the square of the next previous number, makes possible a simple scheme for adding the number to be squared which is stored in a first register into selected higher order stages of a second register.

The invention described herein may be manufactured and used by or for the Government of the United States of America for governmental purposes without the payment of royalties thereon or therefore.

This invention deals with signal conversion, and more particularly to the generation of the sum of the power of numbers wherein the numbers are represented by a series of pulse trains.

For various applications, it is desirable to determine the sum of the powers of series of numbers. One such application is the calculation of the root mean square value of a number of quantities; this calculation involves determining the sum of the squares of the numbers representing the quantities. Root mean square values are of particular and significant importance in the field of statistical analysis. Another application of the sum of the squares is in the calculation of the familiar pyhthagorian theorem.

The invention provides a means for producing the sum of the powers of numbers contained in a series of pulse trains as the pulse trains are received. The invention accepts these input pulse trains representing the numbers which will be raised to the desired power and then will be added to the sum of the prior raised numbers. The invention sequentially accumulates the pulses representing each number, simultaneously adds the number raised to the desired power to the sum of the preceding numbers raised to the desired power, and stores a running account of the sum as each new number is received. The account can be reset or modified just prior to a new series of pulse trains or as desired. The sum is generated without operations subsequent to the receipt of the pulse trains.

One object of the present invention is the generation of the sum of numbers raised to a power without subsequent operations. Another object is to increase the speed of generating the sum of numbers raised to a power; in fact to make the generation instantaneous.

While another object is to perform the generation without the use of externally supplied base rate pulses to initiate and control operations.

Still another object of the present invention is the generation of the sum of powers with a reduction in hardware necessary to perform the generation and the employment of a straight-forward approach to facilitate maintenance and to permit rapid comprehension of the operation of the invention.

Figure 1:
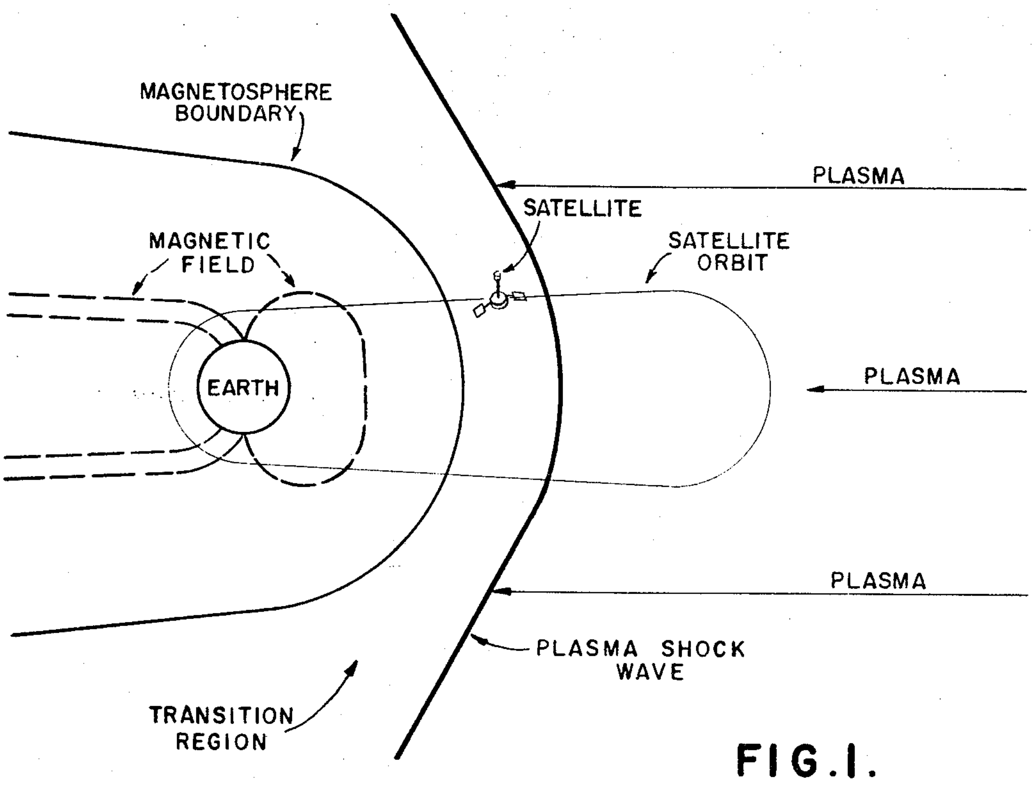
FIGURE 1 is a sketch of an orbit of an Interplanetary Monitoring Platform, IMP, Satellite and its relation to the earth, the plasma from the sun, and the earth's magnetic regions.
Figure 2:
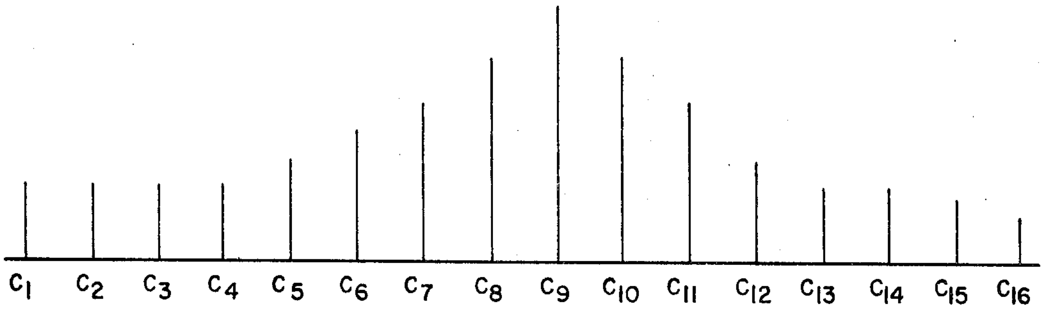
FIGURES 2 and 3 are histograms which are plots of the amplitude of measurements taken at various intervals.
Figure 3:
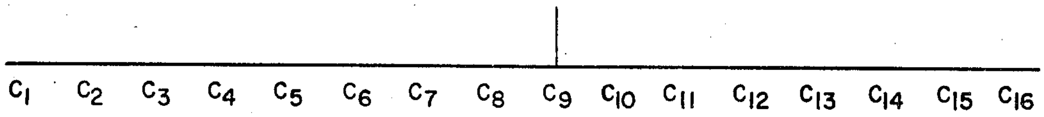

A particular application of the invention is in conjunction with the Interplanetary Monitoring Platform, IMP, Satellite. Reference FIGURE No. 1 shows the earth's magnetic lines of force and the plasma shock wave resulting from the earth's magnetic field; the plasma, electromagnetic radiation from the sun, upon coming into the effective force area of the earth's magnetic field experiences a barrier much like that experienced by a plane encountering the sound barrier. Determination of the position of this plasma shock wave is of scientific importance and is one of the purposes of the IMP Satellite, the orbit of which is shown in FIGURE 1. The plasma strength, is highly directional outside the plasma shock wave and almost non-directional inside the magnetosphere boundary. The IMP Satellite rotates on its own axis and during each rotation a plasma sensor obtains sixteen readings of the plasma strength, these readings are known as interval counts, C, and the plot of them as a histogram. The distribution varies from low uniform readings within the magnetosphere, to random readings in the transition region such as those shown in the histogram in FIGURE 2, to one high reading in the region between the plasma shock wave and the sun, such as that shown in FIGURE 3; the one high reading occurring when the plasma sensor is pointed at the sun. Thus the variation in the interval counts, C's, indicates the position of the plasma shock wave.

Transmitting all sixteen interval count values back to earth would require relatively large amounts of both time and electrical power. To conserve time and power, only one signal representing a function, that of the function $$\frac{16 \sum_{i=1}^{n} C_i^2}{\left(\sum_{1}^{n} C_i\right)^2}$$

(hereinafter referred to as the function), is transmitted back to earth. It can be shown that when the interval counts are low and uniform the function will be equal to one, but when the interval counts consist of only one high value the function will be equal to sixteen. The function varies between one and sixteen, depending upon the satellite orbital position with respect to the plasma barrier. The function values transmitted back to earth indicate the plasma profile at particular orbital positions. Generation of the function requires determining $\Sigma ci^2$ which is the sum of the squares of the individual interval counts.

In the field of computers, to obtain the sum of the powers of numbers the general practice has been to raise each number to the desired power utilizing adding and shifting techniques, and then to develop the sum by adding techniques. These shifting and adding operations involve the use of complex and costly hardware; the operation of which is also very time consuming. In the prior art methods of generating the conversion, squaring, and adding take place after the series of pulse trains being converted have occurred, so that the subsequent shifting and adding operations found in the prior art methods require a clocking pulse train to control these operations. Additional cost and hardware is necessary to produce this clocking pulse train, which serves as the initiating means for the subsequent operations.

In order to fully understand the instant invention a comprehension of two mathematical relationships is necessary. These mathematical relationships deal with the summation of integers and with series of perfect squares.

The function $\Sigma n$, the summation of an arithmetic series of integers where $n$ could be any integer from one to infinity, is equal to $$n^2+n/2$$

this can easily be seen from the following tabulation:

| $n$: | $\Sigma(n)$ |
|---|---|
| 1 | 1 |
| 2 | 3 |
| 3 | 6 |
| 4 | 10 |
| 5 | 15 |
| 6 | 21 |

The importance of these relationships lies in the fact that for large values of $n$ the above function is approximately proportional to $n^2/2$ or $Kn^2$ where K is constant. This relationship is relied on in the present invention to first accumulate one by one, in a binary register the pulses which compose the number to be raised to a power. Another register is then arranged so as to be incremented by the value of the count in the first register every time the first register receives a pulse, thereby accumulating the counts in the second register. Thus the summation of $n$, $\Sigma(n)$, is performed and an approximation to $Kn^2$ results. By adding another accumulation step to accumulate $\Sigma[\Sigma(n)]$ a function is obtained which is an approximation to $Kx^3$. Varying the exact mechanism of accumulation can result in the exact higher power without deviating from the contemplation of the present invention.

As explained above the invention in its broadest form provides a result which is an approximation of the sum of the numbers raised to a desired power which becomes more exact as the number increases in magnitude. Particular requirements demand more accurate approximations and in some cases the exact sum of the numbers raised to the desired power. Flexibility in determining the degree of exactness of the results is one of the features of the invention and is accomplished by varying the operational stages and steps. An explanation of the instant invention's teaching of the generation of exact sum of squares of numbers composed of integer will be particularly elucidated as an aid in understanding the broader invention.

Figure 4:
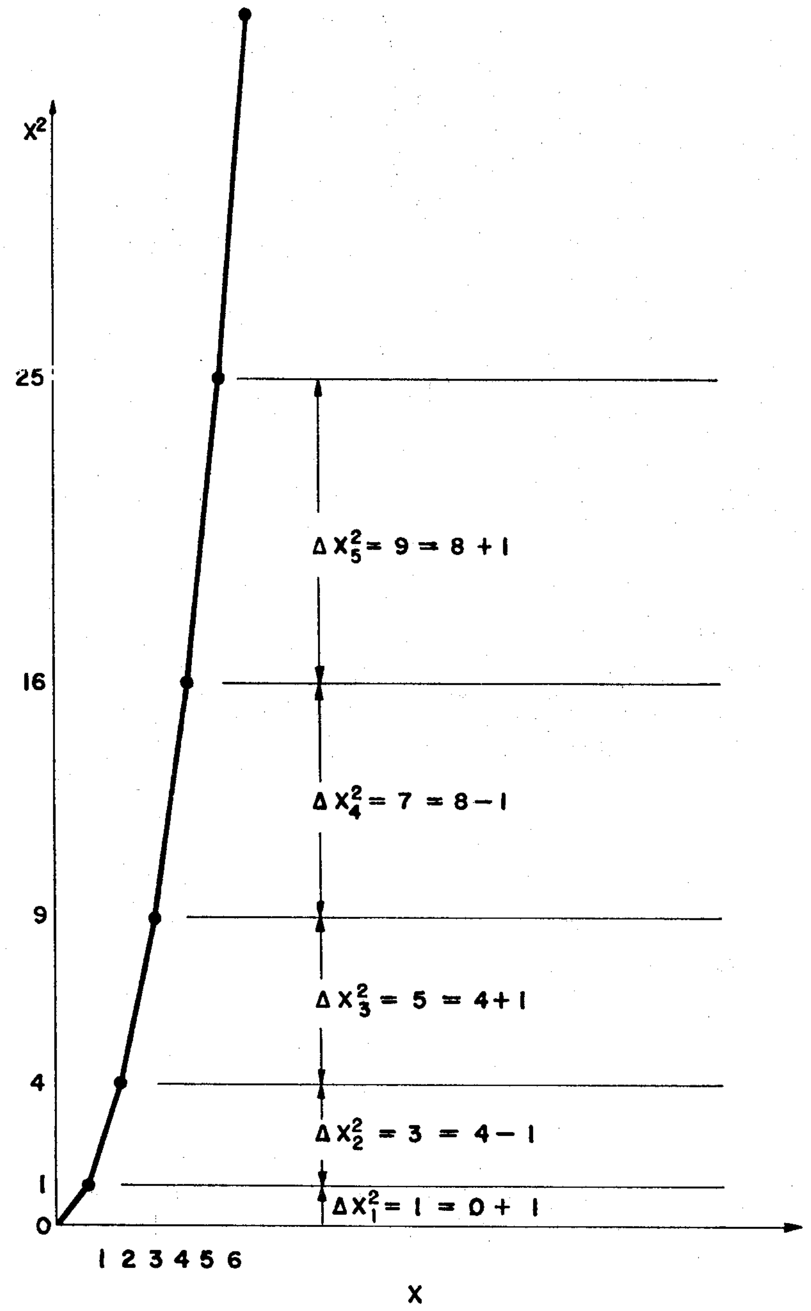
FIGURE 4 is a simple graph of $x^2$ versus $x$.

In order to obtain the sum of a series of the squares of numbers instantaneously it is first necessary to obtain the square of each number. To do this the present invention relies on the mathematical relationship involved in the square $X^2$, of a number, X. FIGURE 4 is a plot of $X^2$ versus X; from the plot it can be seen that for any value of $X_n$ where $n$ is an integer from 1 to $\alpha$, that $$X_n^2=(X_{n-1})^2+\Delta X^2$$

where $\Delta X^2$ is the difference between $$X_n^2$$

and the square of the next smaller interger. It can be seen that a series composed of $\Delta X^2$ can be derived namely; 1, 3, 5, 7, 9, etc., this series, the $\Delta X^2$ series, is composed of all the odd intergers. One characteristic of this series is that when each number is added to the sum of the prior number, a series of perfect squares, $X^2$ series, is generated, which is: 1, 4, 9, 16, 25, 36, etc. Therefore, the square of any number can be generated by adding up the amount of terms in the above $\Delta X^2$ series equal to the number of which the square is desired. If, instead of the $\Delta X^2$ series another series, namely 0, 4, 4, 8, 8, 12, 12, 16, 16, 20, 20, 24, 24, etc. is utilized this $\Delta X^2\pm1$ series has the characteristics that each term differs from the $\Delta X^2$ series by one and when each number is added to the sum of the prior numbers a new series, referred to as "approximately $X^2$" series, is generated, in which the even numbers equal the corresponding numbers in the series of perfect squares, while the odd numbers equal the corresponding numbers in the series of perfect square minus one. This relationship is shown in the following:

Series of perfect squares, $X^2$ series: 1, 4, 9, 16, 25, 36, etc.

Approximately $X^2$ series: 0, 4, 8, 16, 24, 36, etc.

If the binary equivalents of the numbers in the approximately $X^2$ series are drawn out and compared with straight binary equivalents of decimal numbers thusly:

| No. $x$ | Binary Coded Decimal 8, 4, 2, 1 | $\Delta X^2\pm1$ | Binary Coded Decimal 16, 8, 4, 2, 1 |
|---|---|---|---|
| 1 | 0001 | 0 | 00000 |
| 2 | 0010 | 4 | 00100 |
| 3 | 0011 | 4 | 00100 |
| 4 | 0100 | 8 | 01000 |
| 5 | 0101 | 8 | 01000 |
| 6 | 0110 | 12 | 01100 |
| 7 | 0111 | 12 | 01100 |
| 8 | 1000 | 16 | 10000 |
| 9 | 1001 | 16 | 10000 |

It can be seen that if the "one" bit column is deleted in he binary representation of the $\Delta X^2+1$ series, and the "one" bit column of the binary representation of decimal number is made all zeros then the two representations are the same namely:

| No. $x$ | Binary Coded Decimal (Modified) 8, 4, 2, 1 | $\Delta X^2\pm1$ | Binary Coded Decimal of $\Delta X^2\pm1$ 16, 8, 4, 2 |
|---|---|---|---|
| 1 | 0000 | 0 | 0000 |
| 2 | 0010 | 4 | 0010 |
| 3 | 0010 | 4 | 0010 |
| 4 | 0100 | 8 | 0100 |
| 5 | 0100 | 8 | 0100 |
| 6 | 0110 | 12 | 0110 |
| 7 | 0110 | 12 | 0110 |
| 8 | 1000 | 16 | 1000 |
| 9 | 1000 | 16 | 1000 |

The invention utilizes the above factors namely that the sum of a quantity of the terms of the $\Delta X^2\pm1$ series equal to the number to be squared will result in perfect squares for even numbers and perfect squares minus one for odd numbers, and that before mentioned modified binary equivalents of decimal numbers are exactly the same as the before mentioned modified equivalents of the $\Delta X^2\pm1$ series to generate the exact squares of numbers and form the exact squares to generate the sum of the squares.

Figure 5:
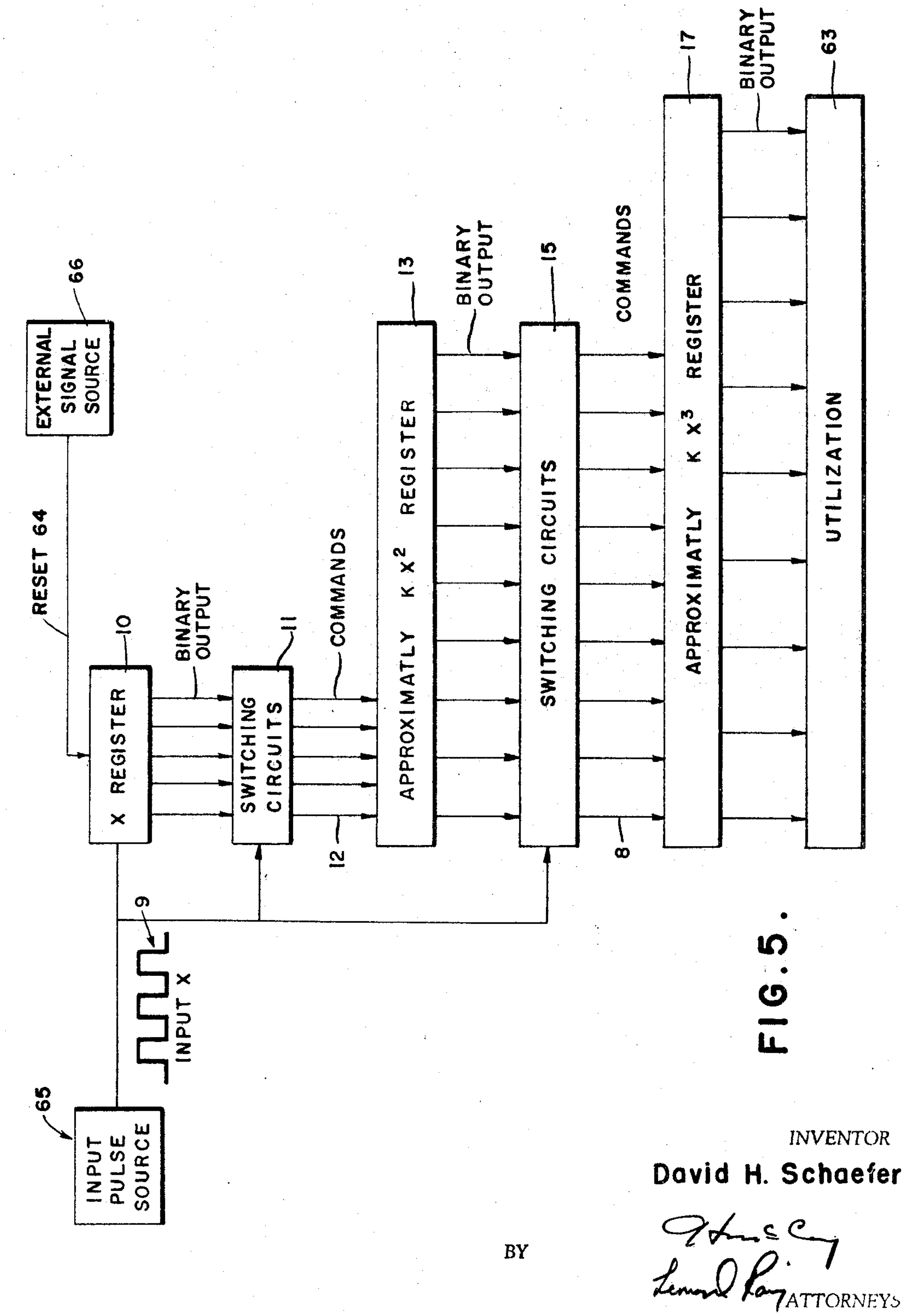
FIGURE 5 is a block diagram of the general invention.
Figure 6:
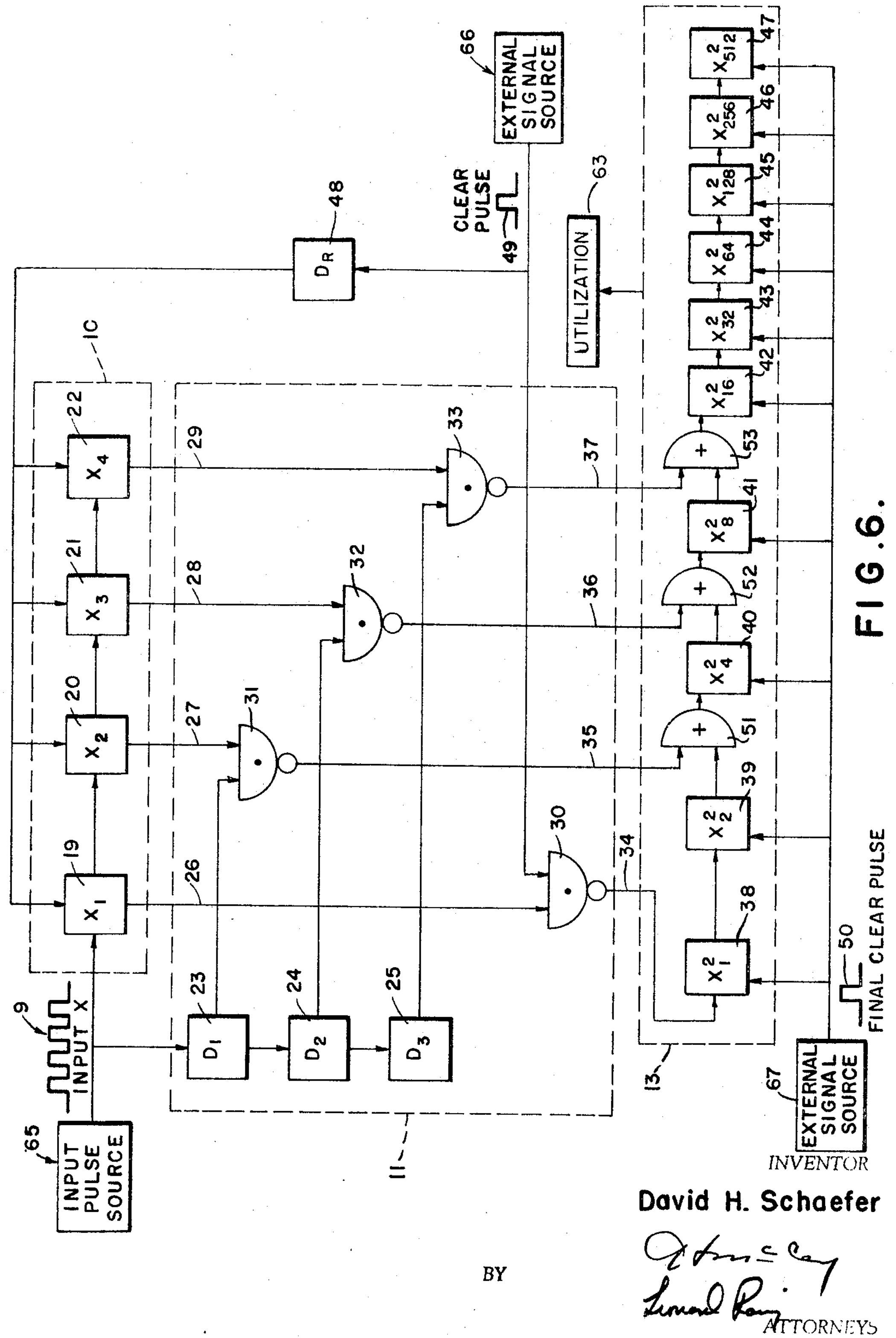
FIGURE 6 is an overall block diagram of a preferred embodiment of the invention and FIGURE 7 is a logic diagram of a binary accumulator.
Figure 7:
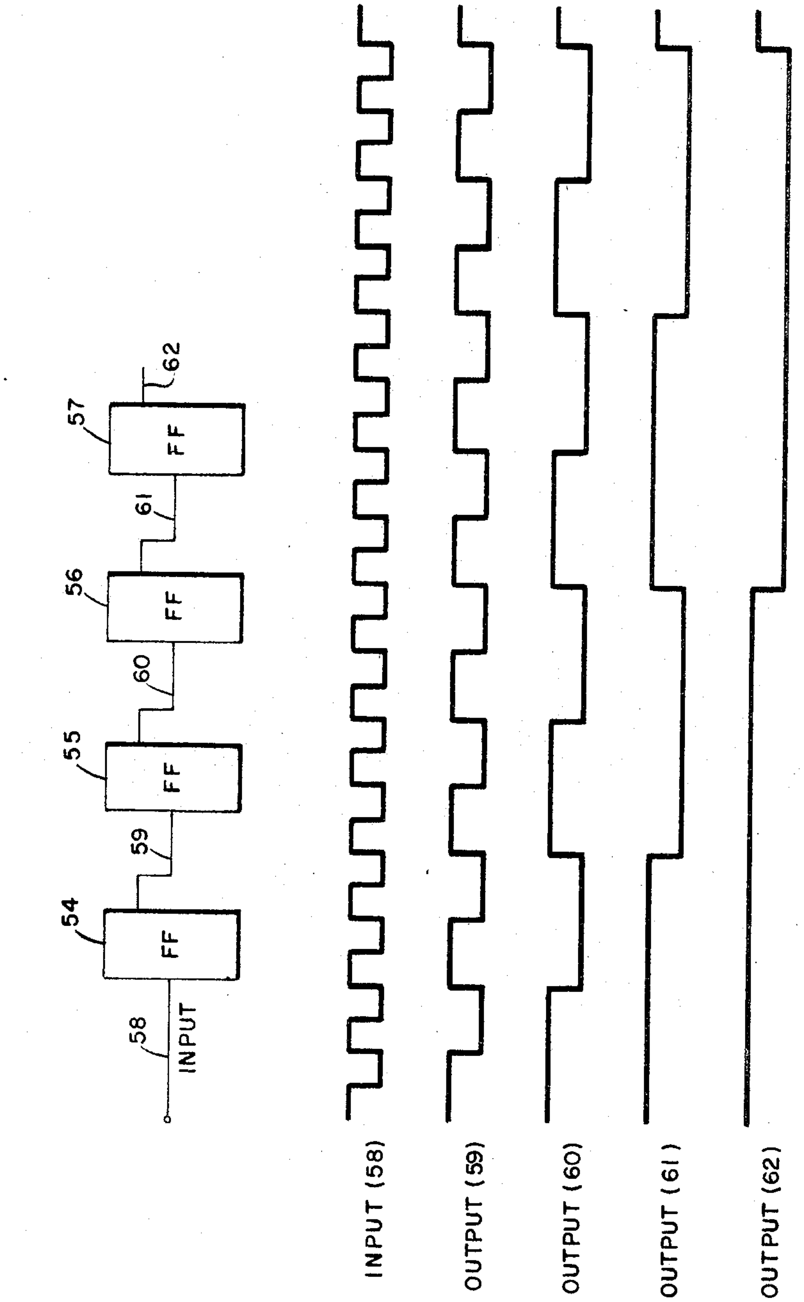

The following description should be viewed in conjunction with the accompanying drawings in which FIGURE 5 is a block diagram of the general invention, FIGURE 6 is an overall block diagram of a preferred embodiment of the invention and FIGURE 7 is a logic diagram of a binary accumulator.

In the embodiment of the invention illustrated in FIGURE 5 there is shown an input 9, which is a series of pulse trains with a number X of pulses, X representing the number to be raised to a power and then added to the prior powered numbers. These pulse trains are derived from an input pulse source such as a photomultiplier, a computer, or a sequenced digital to analog converter. Each pulse train is accumulated in binary form by a register 10 which may be composed of binary bistable devices. The binary output of the register is fed into switching circuits 11, also applied is the input pulse train 9. The output of 11 is a series of sequenced commands (control functions) 12 which add the binary number accumulated by register 10 into an approximately $KX^2$ register 13, which also may be composed of binary bistable devices. The approximately $KX^2$ register 13, is commanded by output 12 to add each number accumulated in register 10, after each input pulse is received, to the sum of the prior numbers accumulated in register 13. Prior to receipt of the next number register 10 must be reset. This is performed by a reset signal 64. This reset signal is either externally provided or is extracted from the pulse trains through detection of unique spacing between the pulse trains 9 or some other distinguishing means.

The binary output of register 13 is applied to switching circuits 15, also applied are the output commands of switching circuits 11 and the input pulse trains 9. The commands 8 from switching circuits 15 control an approximately $KX^3$ register 17 so that each number accumulated in the approximately $KX^3$ register after each pulse accumulation is added to the sum of prior accumulations to result in a running tabulation in register 17 of $KX^3$. It can be seen that the addition of further delay and gating means and registers would result in obtaining higher power sum functions. The information in the last register, the required sum, is supplied to any desired output or utilization device, represented schematically at 63. This output or utilization device may be a computer, buffers, a decoder, or a display.

One of the embodiments of the present invention is illustrated in FIGURE 6. This embodiment is an exact sum of squares generator, having an input of pulse trains which is also a series of pulse trains 9 derived from an input pulse source 65. This pulse train may, for example, be electrical pulses with the number of pulses in each train, X, representing the number to be squared and then added to the prior squares. These pulse trains are applied into a primary accumulator register composed of bistable devices 19, 20, 21 and 22. These bistable devices may be electrical flip flops which are connected so as to accumulate in binary form the number represented by the total number of pulses in each input pulse train. The input pulse trains are also applied to a series of delay generators 23, 24, 25. These delay generators may be electrical monostable multivibrators.

The output of delay generator 23 serves as the input to delay generator 24, the output of which is applied to delay generator 24. Thus, each output of the three delay generators is delayed from the prior output or outputs The delays are selected so that the output of the last delay generator is less than the shortest interval between pulses in the input pulse trains 9.

Outputs 26, 27, 28, 29 of the bistable devices 19, 20, 21, 22 represent the binary accumulation of the input pulses and are each introduced as one input of "and" gates 30, 31, 32 and 33 which may be electrical diode gates, the other inputs to gates 31, 32 and 33 are the outputs of the three delay generators. Output 26 is an input along with clear pulse 49 to gate 30. When both an output 27, 28 or 29 from the primary register, and the corresponding delay generator outputs are logical "ones" then the particular gate output will be a logical "one"; at all other times this gate output will be a logical "zero."

The outputs of gates 30, 31, 32 and 33 are designated 34, 35, 36 and 37 respectively. These outputs which are the sequenced commands (control functions) serve as inputs to a second register (secondary register) which stores the $X^2$ functions and is composed of bistable devices, which may be electrical flip flops, designated 38 through 47, connected to accumulate in binary form.

The output 34 of gate 30 is the input to bistable device 38, the output 35 of gate 31 is an input to bistable device 40 via gate 51, and the output 36 of gate 32 is an input to bistable device 31 via gate 52, and the output 37 of gate 33 is an input to bistable device 42 via gate 53.

A clear pulse 49 such as, for example, an electrical pulse which occurs after each pulse train derived from an external signal source 66 is the other input to gate 30; this clear pulse also triggers a delay generator 48 which may be an electrical monostable multivibrator and pulse shaper. The output of delay generator 48 is connected to the reset buss of the primary register bistable devices. A final clear pulse 50 similar to clear pulse 49, and derived from an external signal source 67 occurs after all the input pulse trains have been received and is connected to the reset buss of the bistable devices composing the secondary register.

After each input pulse of the input pulse train being squared is accumulated, the gate outputs 35, 36, 37 update bistable devices 40, 41 and 42 respectively by means of gates 51, 32 and 53 respectively only when the gate output is a "one." Bistable devices 40, 41 and 42 accumulate the $2^2$, $2^3$ and $2^4$ terms respectively in the secondary register 13. Thus after each input pulse the binary representation of the modified $\Delta X^2$ series is added to the prior sum in the secondary register 13 so that the register is registering the perfect squares of the input pulses when the number of input pulses is even and the perfect squares minus one when the number of input, pulses is odd. After the last input pulse train is entered clear pulse 49 allows gate 30 to assume a "one" output 34 if the output 26 of the bistable device of the primary register is "one," as it would be if the number of input pulses in the particular train was odd. If the number was odd the first bistable device 38 of the secondary register would be set to a "one" by means of gate 30 output 34 thus, making the number in the secondary register 13 equal to the perfect square of the number represented by the input pulse train.

The clear pulse 49 also triggers delay generator 48 of the output of which resets the bistable devices of the primary register to "zero" in readiness for the next pulse train.

As each pulse train is received the square of the number of pulses in the particular pulse train is added to the sum of the squares of the preceding numbers represented by the pulse trains so that the secondary register is accumulating the sum of the squares of the numbers.

After all the numbers have been squared and the squares added a clear pulse 50 from an external signal source 67 resets all the bistable devices of the secondary register in preparation for the next series of input pulse trains.

While the above embodiments shows only four stages or bistable devices in the primary register any number could be included, depending upon the magnitude of the number X represented by any given input pulse train. In addition, the number of stages in the secondary register could be expanded to any number depending upon the number of input pulse trains and the numbers represented by the input pulse trains.

Binary register connections and operational wave forms are illustrated in FIGURE 7. The following description will explain the operation of a binary register. The register is composed of bistable devices 54, 55, 56 and 57 such as electrical flip flops. The input 58 to the register is a series of pulses which will be accumulated. The bistable devices are connected such that the output of the first is the input to the second, the output of the second is the input to the third, and the output of the third is the input to the fourth. For the purposes of this explanation, a transition from low level to a high level, i.e., positive transition at the input to a bistable device results in a change in state of the bistable device. Therefore, input pulses 58 will cause flip flop 54 to change state for each input pulse. If all the bistable devices of the accumulator are in their low or "one" state, then the output 59 of the first bistable device 54 will change from "one" to a high or "zero" state after two positive transitions of the input waveform, the second bistable device output 60 will only change after four positive transitions, the third 61 after eight, and the fourth 62 after sixteen. Thus each bistable device or stage of the register divides the prior input by two. If the output 59 of the first bistable device 54 is assigned a weight of 1 when the output is "one" or 0 when the output is "zero" the output 60 of bistable device 55 a weight of 2 and 0, the output 61 of bistable device 56 a weight of 4 and 0, and the output 62 of bistable device 57 a weight of 8 and 0 then as the pulses are accumulated the bistable device states represent the binary equivalent of the number. Thus the register accumulates the number of input pulses in binary.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for computing the sum of numbers, each number being raised to the second power, wherein each of said numbers is represented by a serial train of input pulses equal in number of the said represented number, said system comprising in combination:

a first registering means for sequentially accumulating in binary form said input pulses representative of a said number, said first registering means having a plurality of stages, and further having output signals representing the number of pulses accumulated, each said stage of said first register means being simultaneously resettable;

a control function means responsive to each of said input pulses and to said output signals from said first registering means to produce signals representing control functions;

a second registering means coupled to said control function means and responsive to said signals representing said control functions for accumulating signals representing the number of pulses present in said first registering means following the receipt of each of said input pulses;

said control function means further comprising, a delay generating means responsive to each of said input pulses to produce output pulses successively delayed from each of said input pulses; and a gating means coupled to said first registering means and to said delay generating means to accept said output pulses from said delay generating means and said output signals from said first registering means to produce signals representing control functions; and wherein said second registering means is coupled to said gating means.

2. The system of claim 1, wherein said delay generating means is comprised of a plurality of delay elements.

3. The system of claim 1, further including a signal source and wherein:

said first registering means comprises a first, a second, a third, and a fourth bistable device serially connected in that order with said first bistable device coupled to receive said input pulses;

said delay generating means comprises a first, a second, and a third delay device serially connected in that order with said first delay device coupled to receive said input pulses;

said signal source is coupled to said first, second, third and fourth bistable devices and produces a signal representing a clear pulse;

said gating means comprises a first, a second, a third, and a fourth gating device, said first gating device coupled to said first bistable device and to said signal source, said second gating device coupled to said first delay device and to said second bistable device, said third gating device coupled to said second delay device and to said third bistable device, and said fourth gating device coupled to said third delay device and to said fourth bistable device; and said second registering means comprises a first, a second, and a third gating element and a plurality of bistable elements; and said first gating device is coupled to a first of said plurality of bistable elements, said first bistable element is coupled to a second of said plurality of bistable elements, said first gating element is coupled to said second gating device and to said second bistable element, a third of said plurality of bistable elements coupled to said first gating element, said second gating element coupled to said third bistable element and to said third gating device, a fourth of said plurality of bistable elements coupled to said second gating element, said third gating element coupled to said fourth gating device and to said fourth bistable element, and the remaining bistable elements of said plurality of bistable elements connected serially with the first of said remaining bistable elements coupled to said third gating element.

4. A system for computing the sum of numbers each raised to an integer power, wherein each of said numbers is represented by a serial train of input pulses equal in number to the number represented thereby, said system comprising in combination:

a primary registering means connected to receive the pulses of each of said train of input pulses and operating to sequentially accumulate said pulses in binary form and to provide output signals representing the number of pulses accumulated;

a primary control function means connected to receive said input pulses and said output signals from said primary registering means and responsive to said input pulses and said signals representative of the number of pulses accumulated in said primary registering means to develop signals representing control functions;

a primary resetting means connected to said primary registering means for resetting said primary registering means to a predetermined condition;

a plurality of registering means, equal in number to said integer power minus one;

a first of said plurality of registering means connected to said primary control function means to accept said signals representing control functions, upon the receipt of each of said input pulses, and to total the number of pulses accumulated in said primary registering means;

a plurality of control function means, equal in number to said integer power minus two, each of said plurality of control function means connected between a succeeding and a preceding registering means of said plurality of registering means, to develop control signals responsive to said input pulses and to the number accumulated in an associated registering means of said plurality of registering means; and a second resetting means connected to each of said plurality of registering means for resetting each said plurality of registering means to a predetermned condition.

5. The system of claim 4 wherein said primary control function means is comprised of a plurality of delay generating means responsive to each of said input pulses so as to produce output signals successively delayed from each of said input pulses and a plurality of gating means connected to said primary registering means to accept said output signals from said delay generating means and said output singals to said primary registering mean to produce said signals representing control functions reponsive to aid input pulses and the number of pulses accumulated in said primary registering means.

6. A circuit for providing the exact sum of squares of a plurality of numbers, each said number being represented in a unitary system by a series of pulses, said number having a maximum of $2^n-1$ pulses, $n$ being any positive integer, wherein the arithmetic sum of said pulses equals the number represented by said series of pulses, said circuit comprising:

a first register responsive to said series of pulses for accumulating said pulses, said first register comprising a first, second . . . $n$th stages, each of said $n$ stages having a true output, and a reset input;

a pluraliy of AND gates, comprising a first, second . . . $n$ gates, each said $n$ gates having two inputs and one output, one said input of said first AND gate being coupled to said true output of said first stage of said first register, one said input of each said remaining $n$ AND gates being coupled to said true output of a said respective $n$ stage of said first register;

a delay means, said delay means being responsive and referenced to said pulses of said data train, said delay means providing $n-1$ outputs, each said delay means output being delayed to a greater extent than the next lower delay means output, said first output of said delay means being coupled to the other said input of said second AND gate, one said output of each said remaning $n-1$ delay means outputs being coupled respectively to the other said input of said remaining AND gates so that the delay means output being the said $n-1$ output is coupled to the other input of said $n$th AND gate;

a plurality of OR gates comprising a first, second . . . $n-1$ gates, each said gate having two inputs and one output;

a second register, said second register comprising at least a first, second . . . $2n$ stages, each stage having an input and an output, each said second through *nth* stages of said second register having said second register output coupled to one input of a said OR gate, said output of said second stage of said second register being coupled to said one input of said first OR gate, said $n$ remaining outputs of said second register stages being connected respectively to said one input of said OR gates so that said $n$th stage output of said second register is coupled to said $n-1$ OR gate; said output of said second AND gate being coupled to the said other input of said first OR gate, the said output of said remaining higher numbered AND gates being coupled respectively to the other said input of said OR gates so that the output of said $n$th AND gate is coupled to the other input of the said $n-1$ OR gate;

said output of said first OR gate being coupled to said input of said 3rd stage of said second register, said remaining OR gate outputs being coupled to said respectively higher numbered stages of said second register so that said output of said $n-1$ OR gate is coupled to the said input of the $n+1$ stage of said second register;

reset means, said reset means output being coupled to the said other input of said first AND gate, and to each said reset input of each stage of said first register; and said output of said first AND gate being coupled to the input of said first stage of said second register.

7. A method for obtaining the sum of the squares of a plurality of numbers, each number being represented in the unitary system by a series of pulses, said method comprising:

(a) applying a first pulse of said series of pulses representative of a number to first stage of a first accumulator comprising a plurality of stages for accumulation on the binary basis;

(b) delaying to allow said first accumulator sufficient time to complete the accumulation on the binary basis of said pulse;

(c) interrogating the second stage of said first accumulator to determine whether said second stage is in a one state;

(d) switching the state of the third stage of a second accumulator comprising a plurality of stages when the said second stage of said first accumulator has been determined to be in a one state;

(e) delaying to allow said second accumulator sufficient time to respond to any carry pulse generated in step (d);

(f) interrogating the third stage of said first accumulator to determine whether said third stage is in a one state;

(g) switching the state of the fourth stage of a said second accumulator when the third stage of said first accumulator has been determined to be in a one state;

(h) delaying to allow said second accumulator sufficient time to respond to any carry pulse generated in step (g);

(i) applying a next pulse of said series of pulses representative of a number to said first stage of said first accumulator;

(j) repeating steps (b) through (h) for each said next pulse of said series of pulses until all pulses of said number to be squared are processed;

(k) resetting all stages of said first accumulator to zero state;

(l) applying a first pulse of said series of pulses representative of the next of a plurality of numbers the sum of the squares of said numbers of which is desired;

(m) repeating steps (b) through (k).

8. A method as defined by claim 7 wherein a further step after step (j) but before step (k) includes:

(1) interrogating the first stage of said first accumulator to determine whether said first stage is in a one state;

(2) switching the state of the first stage of said second accumulator when the first stage of said first accumulator has been determined to be in a one state; and (3) delaying to allow said second accumulator sufficient time to respond to any carry pulse generated in step (2) above.

9. A method for obtaining the sum of the squares of a plurality of numbers, each number being represented in a unitary system by a series of pulses, said method consisting of the following steps:

(a) applying sequentially a series of pulses representative of the first of said plurality of numbers to a first stage of a first accumulator said first accumulator comprising a plurality of stages for accumulation on a binary basis;

(b) operating said first accumulator for each pulse of said series of pulses for a sufficient time to complete the accumulation on the binary basis of each sequential pulse;

(c) interrogating sequentially, following each pulse of said series of pulses, each successive stage starting with the second stage of said first accumulator to determine whether said stages of said first accumulator are in a one state, each sequential interrogating being delayed from the previous interrogation;

(d) switching the state of the stages of a second accumulator, starting with the third stage thereof, the switching of said third stage to occur after said second stage of said first accumulator is interrogated and determined to be in a one state, each of the higher order stages of said accumulator being switched after each respective next lower order stage of said first accumulator is interrogated and determined to be in a one state;

(e) resetting all of said stages of said first accumulator to zero state after all pulses of said number to be squared are processed; and (f) applying successively to said first stage of said first accumulator the series of pulses representative of each number of the remainder of said plurality of numbers to be squared and summed and repeating steps (b) through (f) for each of said series of pulses for each of said numbers.

10. The method of claim 9 wherein step (d) at the end thereof, further includes the steps of:

($d_1$) interrogating the first stage of said first accumulator to determine whether said first stage of said first accumulator is in a one state; and ($d_2$) switching the state of the first stage of said second accumulator when the first stage of said first accumulator has been determined to be in a one state.

References Cited

UNITED STATES PATENTS

| | | | |
|---|---|---|---|
| 2,751,149 | 6/1956 | Young et al. | 235—158 X |
| 2,888,200 | 5/1959 | Weiss | 235—158 |
| 3,280,314 | 10/1966 | Weigler | 235—158 X |
| 3,379,865 | 4/1968 | Sinniger | 235—168 |

MALCOLM A. MORRISON, Primary Examiner

C. E. ATKINSON, Assistant Examiner

U.S. Cl. X.R.

235—164, 168, 175